H. N. DUNBAR.

FENCE-POSTS.

No. 7,413.

Reissued Dec. 5, 1876.

Witnesses:

Arthur B. Malin

E. R. Hill

Inventor:

Henry N. Dunbar

THE GRAPHIC CO. N.Y.

UNITED STATES PATENT OFFICE.

HENRY N. DUNBAR, OF MENTOR, OHIO.

IMPROVEMENT IN FENCE-POSTS.

Specification forming part of Letters Patent No. 127,749, dated June 11, 1872; reissue No. 7,413, dated December 5, 1876; application filed May 29, 1876.

*To all whom it may concern:*

Be it known that I, HENRY N. DUNBAR, of Mentor, in the county of Lake and State of Ohio, have invented certain new and useful Improvements in Posts, of which the following is a specification, reference being had to the accompanying drawing and the letters thereon.

My invention relates to an improved manner of constructing and bracing posts, for which a patent was granted me June 11, 1872, No. 127,749, which improvement is hereinafter described, reference being had to accompanying drawing, and the letters of reference thereon, in which—

Figure 1:
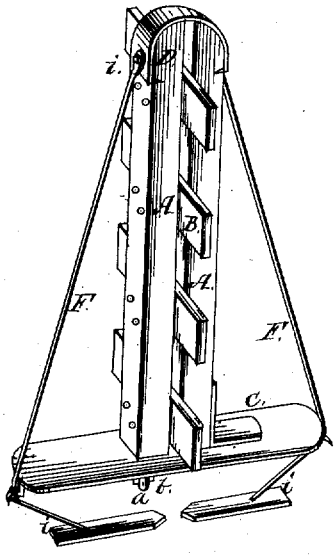
Figure 2:
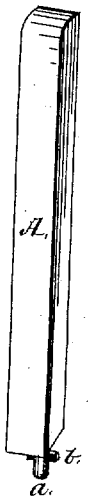

Figure 1 is a perspective view. Fig. 2 is a detailed view.

The object of my invention is to overcome the tendency of the post to decay below the surface, and to prevent the post being lifted by frost.

A A, Figs. 1 and 2, represent that portion of the post which may be formed of wood, standing entirely above the surface, and may be made in two parts. The top of the post may be rounded and covered with a zinc or metal cap, if desired. The brace-rod F (shown in the drawing) is firmly secured to the post A on either side, and is bent at the bottom, so as to form the angular arm *i*, which is placed in an excavation of sufficient depth to obtain a strong hold where it is firmly anchored, as hereinafter described. The bottom of said brace is connected to the bottom of a corresponding brace on the opposite side of post, to give it rigidity and firmness. This connection may be made by connecting the bottom of each brace to a connecting-bar, C. An anchor of stone or other suitable material may be used in connection with the arm *i*, and may be secured to it in any convenient and substantial manner, if deemed necessary, thus giving more bearing and anchoring surface on soft ground. The arm *i* is firmly anchored in the excavation by packing stone, gravel, or earth in the excavation upon, above, and around it, and upon, above, and around the anchor, if an anchor be used, until it becomes firm and immovable. This iron setting is not lifted by frost, and its wide base and central bearing give it a stability and permanence altogether uncommon to the posts in common use.

I claim—

In combination with a post, the brace-rod F, bent at the bottom, so as to form the angular arm *i*, by which the post is anchored in the ground, substantially as described, and for the purpose herein set forth.

HENRY N. DUNBAR.

Witnesses:

ARTHUR B. MALIN,
E. R. HILL.